TRACTOR IMPLEMENTS
Filed May 27, 1965
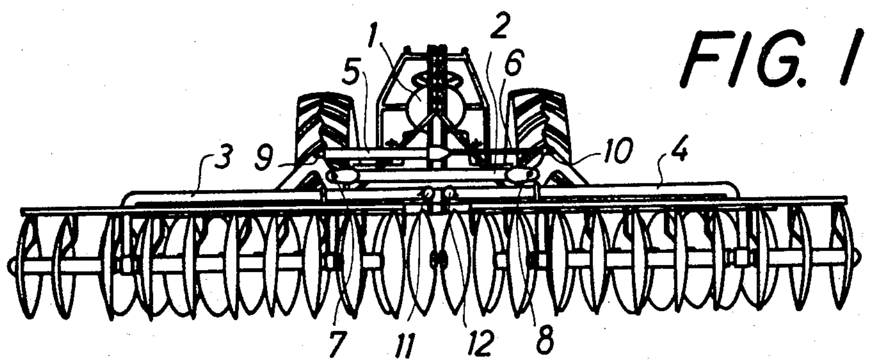
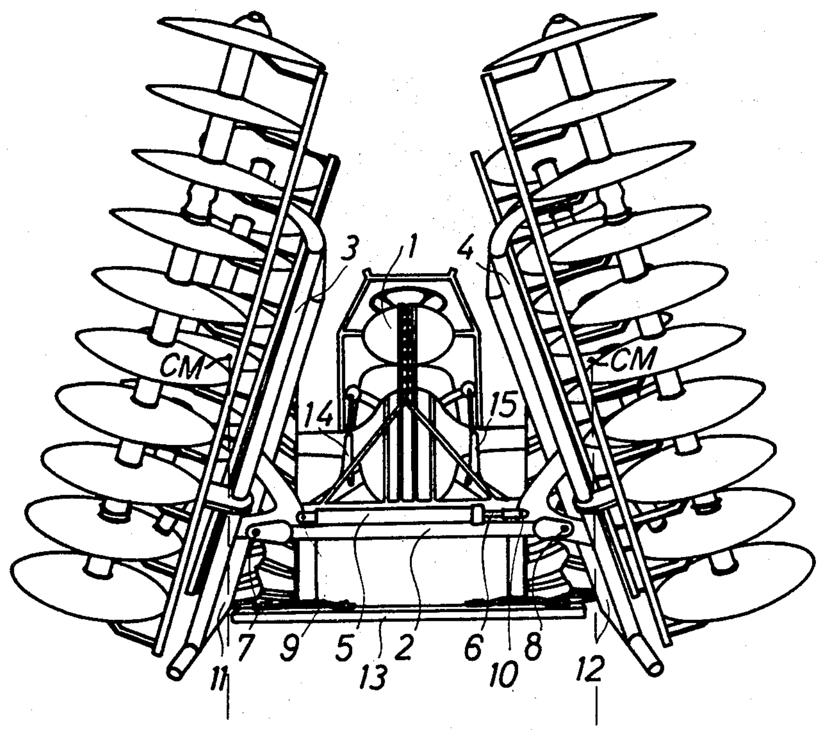
INVENTOR
Olav Njå
BY Pierce, Scheffler & Parker
ATTORNEYS United States Patent Office 3,401,752

Patented Sept. 17, 1968

3,401,752

TRACTOR IMPLEMENTS

Olav Njå, Kvernaland, Norway, assignor to Kvernelands Fabrikk A/S, Kvernaland, Norway Filed May 27, 1965, Ser. No. 459,392
Claims priority, application Norway, June 12, 1964, 153,641
2 Claims. (Cl. 172—452)

ABSTRACT OF THE DISCLOSURE

A tractor drawn agricultural ground working implement comprises at least two ground-working sections the inner ends of which are pivotally connected on a frame adapted to be attached to the tractor. When the frame is elevated by the tractor to clear the implement from the ground, the two sections are actuatable by a ram to be swung upwardly about their respective pivot axes to a raised position for transport by the tractor, or for parking when released from the tractor. When the sections occupy their raised position, the center of mass of each section is so located that a line projected vertically downward from such center to the ground passes to the outside of the pivot axis. Thus, with the frame in its elevated position clear of the ground, the raised implement sections will be in an unstable position and hence will automatically lower themselves into the ground-working positions when the ram is released. With the implement sections in their raised position, the frame can then also be lowered to the ground for parking, in which case the implement sections will occupy a stable position since the lower ends of the sections which make contact with the ground then lie to the outside of the aforementioned line of projection from the center of mass as well as to the outside of the pivot axis.

As tractors increase in size they become capable of drawing much larger implements. When it is a question of implements for operating in as large an area as possible at the same time, as with for instance disc harrows, these may be so large that it is difficult to transport them along roads and highways. There exist today harrows which are 4–5 metres wide, for instance, and it is obvious that it would be both dangerous and even sometimes impossible to drive with such implements on public highroads. It is previously known to construct such implements in several sections or parts and the implements are then dismantled and transporated on trailers, trucks or special transport wheels.

There are also harrow constructions which are mounted in several sections, and in such a way that the outer sections may be folded in, but these harrows are comparatively small, and the whole operation is carried out manually.

When one is faced with implements of the size which modern tractors are today capable of drawing, it will often be found that manual power is not enough to swing up two sections of a harrow into transport and parking positions, and because of this, hydraulic rams are used for this purpose. This introduces a new problem, however, caused by the fact that the harrow is maintained in folded position so long the the hydraulic ram is actuated, but when the implement is removed and parked, in order that the tractor may be used for other purposes, the hydraulic ram will be disconnected, and if special measures are not then taken, the danger may occur of the implement being unstable and insecure when the hydraulic ram is out of action, with danger and possibility of damage caused by one or several sections of the harrow falling to the ground of themselves. If one considers the fact that a section is 2.5 metres high when parked, these problems need no further elucidation.

The object of the present invention is to avoid this disadvantage by constructing the sections of the implement so that they stand securely in parking position, even when the hydraulic ram is disconnected.

A further object of the invention is to provide an implement construction which will allow the sections to move of themselves by means of the action of gravity when the implement's support is lifted from the ground.

These objects are achieved by the center of mass of each section, on being swung up, being located in a determined relation to the said support and to the pivot axis of the implement.

The invention thus relates to an improvement in tractor implements, comprising a least two sections which are pivotally connected to a frame so that the sections may be swung up for transport or for parking, and it is substantially characterized in the sections being provided with a support which is adapted to come into engagement against the ground on parking of the implement, said supports being outside of a vertical projection line from the center of mass of the section to the ground, and that the pivot axis of the section lies to the inside of the said vertical line of projection from the center of mass.

An example of the invention is shown on the drawing in the form of a large disc harrow which may be folded together in a very simple and easy manner.

FIG. 1 shows the harrow in operating position, while FIG. 2 shows the harrow's side sections swung up into transport and parking position.

The harrow, which is connected to the tractor 1, consists of three main portions, viz. the centre frame 2 and the side sections 3 and 4. For swinging up and folding together the side sections 3 and 4 a single acting hydraulic ram 5 having a plunger 6 is used. The side sections pivot on bolts 7, 8 which are located at a suitable distance from the ram's attachment points 9 and 10, so that the ram will operate on a lever. On harrowing, the side sections 3 and 4 as shown on FIG. 1, will be able freely and mutually to move and the ram 5 is then disengaged so that the plunger 6 may move freely in or out according to the varied nature of the ground. When the side sections 3 and 4 of the harrow are to be folded together, this is achieved by means of the ram 5, the harrow having been first lifted from the ground with the usual bars 14 and 15. The ram then maintains the side sections in up-swung position as shown on FIG. 2, but in accordance with the invention, the center of mass of the side sections 3, 4 as indicated by point CM lies to the outside of the axis of the bolts 7, 8 as is evident from the dashed line projected vertically downward from center of mass point CM to the ground. The sections 3 and 4 will thereby be in an unstable position so far as the force of gravity is concerned and will thereby tend to swing out and down but are prevented from doing so by the ram 5, 6 during transport. When the implement is to be used it is possible, by regulating the valve for the oil supply to the ram 5, to permit the side sections 3, 4 to carefully swing down into working position under the force of gravity and then lower the implement to the ground by means of the bars 14, 15. In as much as the side sections 3, 4, of themselves, automatically move outwards and downwards by the force of gravity when released by the ram, it is sufficient that the hydraulic ram 5 with the plunger 6 is single acting the power exerted by the ram being necessary only for folding the implement sections upwardly to a position of transport or park.

If, however, the implement is to be parked in order that the tractor may be used for other work, the bars 14 and 15, after the side sections 3 and 4 have been swung up into the position shown on FIG. 2, are lowered. The lower edges 11, 12 of each side section, which may be in the form of a strong tube or other suitable support, will support the implement on the ground, and the supports 11, 12, are so positioned and adapted in relation to the center of mass of the side sections, that when the supports 11, 12 rest on the ground, the side sections 3, 4 by reason of their weight will seek to swing in towards the centre point of the implement, and the ram 5, 6 is no longer needed for maintaining the side sections in up-swung position. The inward swinging movement of the implement sections is limited by suitable stop means, such means in the present embodiment being established by the limit of inward movement of the piston rod 6 in the ram cylinder 5. Thus the hydraulic connection lines to the ram, and thereby the whole implement also, may, without danger, be disconnected from the tractor and parked in a suitable place with no danger of the implement damaging itself or others by the side sections unexpectedly tumbling to the ground.

The shown example serves only to illustrate the invention and forms no limitation for this, since the invention may be used on other forms of implements, for instance spring harrows and similar implements which are so large that only with difficulty can they be transported in operating position. By the present invention therefore, an improvement is achieved which results in the transport width of the implement being fairly small in relation to the total width of the implement.

What is claimed is:

1. In a tractor drawn agricultural ground working implement, the combination comprising at least two ground-working implement sections, a frame adapted to be connected to the tractor such as to be elevated and lowered with respect to the ground, means mounting the inner end portions of said implement sections on said frame for pivotal movement about a horizontal axis, power means connected to said implement sections for swinging said implement sections from a ground-working position to a raised positon for transport and for parking when said frame occupies its elevated position, the center of mass of each said implement section when occupying its raised position be so located that a line projected vertically downward from said center to the ground passes outside of said pivot axis, and the lower end of each said implement section when occupying its raised position being located outside of said vertically projected line and also outside of said pivot axis.

2. A ground working implement as defined in claim 1 wherein said power means for swinging said implement sections to their raised position is constituted by a hydraulic ram, the cylinder of said ram being connected to one of said implement sections and the piston rod of the ram being connected to the other implement section.

References Cited

UNITED STATES PATENTS

| | | | |
|---|---|---|---|
| 236,793 | 1/1881 | Evans | 172—242 |
| 3,186,494 | 6/1965 | Jackson | 172—456 X |
| 3,223,177 | 12/1965 | Van der Lely | 172—456 X |

ABRAHAM G. STOKE, *Primary Examiner.*

J. R. OAKS, *Assistant Examiner.*